(12) United States Patent
Little (10) Patent No.: US 8,977,673 B2
(45) Date of Patent: Mar. 10, 2015

(54) INFORMATION ON AVAILABILITY OF SERVICES PROVIDED BY PUBLISH-SUBSCRIBE SERVICE

(75) Inventor: Mark Cameron Little, Ebchester (GB)

(73) Assignee: Red Hat, Inc., Raleigh, NC (US)

( * ) Notice: Subject to any disclaimer, the term of this patent is extended or adjusted under 35 U.S.C. 154(b) by 806 days.

(21) Appl. No.: 12/201,949

(22) Filed: Aug. 29, 2008

(65) Prior Publication Data

US 2010/0057835 A1    Mar. 4, 2010

(51) Int. Cl.
*G06F 15/16* (2006.01)
*H04L 29/08* (2006.01)

(52) U.S. Cl.
CPC ............... *H04L 67/16* (2013.01); *H04L 67/02* (2013.01)
USPC .......................................... 709/203; 709/217

(58) Field of Classification Search
USPC ....................................................... 709/203
See application file for complete search history.

(56) References Cited

U.S. PATENT DOCUMENTS

| | | | |
|---|---|---|---|
| 6,510,429 B1 | 1/2003 | Todd | |
| 7,080,078 B1 | 7/2006 | Slaughter et al. | |
| 7,797,306 B1 | 9/2010 | Pather et al. | |
| 7,802,264 B2* | 9/2010 | Robertson et al. | 709/215 |
| 7,853,643 B1* | 12/2010 | Martinez et al. | 709/203 |
| 7,966,320 B2* | 6/2011 | Roshen | 707/723 |
| 8,832,220 B2* | 9/2014 | Petersen | 709/217 |
| 2001/0013051 A1 | 8/2001 | Nakada et al. | |
| 2002/0198943 A1 | 12/2002 | Zhuang et al. | |
| 2003/0236894 A1 | 12/2003 | Herley | |
| 2004/0028212 A1 | 2/2004 | Lok et al. | |
| 2004/0128673 A1 | 7/2004 | Fuchs et al. | |
| 2006/0069771 A1 | 3/2006 | Gissel et al. | |
| 2006/0200804 A1 | 9/2006 | Cyr et al. | |
| 2006/0217126 A1* | 9/2006 | Sohm et al. | 455/454 |
| 2006/0265489 A1* | 11/2006 | Moore | 709/223 |
| 2006/0265508 A1* | 11/2006 | Angel et al. | 709/230 |
| 2007/0022174 A1* | 1/2007 | Issa | 709/217 |
| 2007/0100836 A1* | 5/2007 | Eichstaedt et al. | 707/10 |
| 2007/0112947 A1* | 5/2007 | Anderson et al. | 709/223 |
| 2007/0118394 A1* | 5/2007 | Cahoon | 705/1 |
| 2007/0121820 A1* | 5/2007 | Ahmann | 379/88.13 |
| 2007/0162421 A1 | 7/2007 | Pang et al. | |
| 2007/0168228 A1* | 7/2007 | Lawless | 705/2 |
| 2007/0219857 A1* | 9/2007 | Seymour et al. | 705/14 |
| 2007/0286100 A1* | 12/2007 | Saaranen et al. | 370/260 |
| 2008/0016217 A1* | 1/2008 | Astley et al. | 709/226 |
| 2008/0034040 A1* | 2/2008 | Wherry et al. | 709/204 |
| 2008/0103800 A1* | 5/2008 | Domenikos et al. | 705/1 |
| 2008/0104258 A1* | 5/2008 | O'Neill et al. | 709/228 |

(Continued)

OTHER PUBLICATIONS

Snell, James, "An Overview of the Atom 1.0 Syndication Format" Aug. 2, 2005. 9 pages. IBM http://www.ibm.com/developerworks/xml/library/x-atom10.html.

(Continued)

*Primary Examiner* — Brian P Whipple
*Assistant Examiner* — James Edwards
(74) *Attorney, Agent, or Firm* — Lowenstein Sandler LLP (57) ABSTRACT

A request pertaining to a category of service is received from a client by an enterprise service bus. One or more status updates are received from a publish-subscribe service by the enterprise service bus, the status updates identifying services of the requested category that are available, wherein each service of the requested class publishes a status update to a syndication feed that is associated with at least one of the service or the category of service. Information concerning at least one service from the requested category is sent to the client.

21 Claims, 4 Drawing Sheets

(56) References Cited

U.S. PATENT DOCUMENTS

| | | | |
|---|---|---|---|
| 2008/0294794 A1 | 11/2008 | Darugar et al. | |
| 2009/0055467 A1* | 2/2009 | Petersen | 709/203 |
| 2009/0117925 A1* | 5/2009 | De Bonis et al. | 455/466 |
| 2009/0125628 A1* | 5/2009 | Dahlen | 709/227 |
| 2009/0228563 A1 | 9/2009 | Jones et al. | |
| 2009/0228584 A1* | 9/2009 | Maes et al. | 709/224 |
| 2012/0240147 A1* | 9/2012 | Rodriguez | 725/25 |

OTHER PUBLICATIONS

Snell, James, "Getting to Know the Atom Publishing Protocol, Part I: Create and Edit Web Resources with the Atom Publishing Protocol" Oct. 17, 2006. 9 pages. IBM http://www.ibm.com/developerworks/library/x-atompp1/.

Snell, James, "Getting to Know the Atom Publishing Protocol, Part 2: Put the Atom Publishing Protocol to Work" Nov. 7, 2006. 10 pages. IBM http://www.ibm.com/developerworks/library/x-atompp2/.

"JBossESB Requirements and Architecture, Version: 0.3," May 2, 2006, 12 pages.

King, Erik, "Perpetual Enterprise Management Service (PEMS) for Next Generation SOA-based Command & Control Systems", Jun. 2005, 49 pages.

"Why ESB and SOA?" Version 0.3, Date: Jan. 27, 2006, 7 pages.

* cited by examiner

INFORMATION ON AVAILABILITY OF SERVICES PROVIDED BY PUBLISH-SUBSCRIBE SERVICE

TECHNICAL FIELD

Embodiments of the present invention relate to distributed systems, and more specifically to providing information regarding available services of a distributed system using a publish-subscribe service.

BACKGROUND

In distributed computing systems having a service oriented architecture, services may be provided by multiple servers at various locations. For a client to utilize available services, the client must know a service address and a service policy (including protocol and message format requirements) of the services. In conventional service oriented architectures, service addresses and service policies are maintained in a service registry along with service descriptions.

Conventional service directories are static directories that do not track whether services in the directory are online or offline. To determine if a service is online, a client typically needs to send a message to the service. If no response is received, then the client can determine that the service is unavailable, and attempt to contact a different service. This can cause unnecessary delay and increased network traffic.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for providing information on available services to clients of a distributed computing system. In one embodiment, a request pertaining to a category of service is received from a client by an enterprise service bus (e.g., by a dynamic service registry of an enterprise service bus). The category of service may be banking services, taxi booking services, airline registration services, etc. One or more status updates are received from a publish-subscribe service by the enterprise service bus. The status updates may be syndication feed entries that provide status information such as service availability, service address, etc. The status updates may be received after sending a query to the publish-subscribe service. Alternatively, the publish-subscribe service may automatically send status updates to the enterprise service bus as the availability of services changes. Each service of the requested category publishes status updates to a syndication feed associated with the service and/or category of service. The syndication feed is hosted by the publish-subscribe service. The enterprise service bus may select a service from the requested category, and send information concerning one or more service from the requested category to the client.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description which follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing", "subscribing", "sending", "receiving", "pushing", "pulling" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes a machine readable storage medium (e.g., read only memory ("ROM"), random access memory ("RAM"), magnetic disk storage media, optical storage media, flash memory devices, etc.), a machine readable transmission medium (electrical, optical, acoustical or other form of propagated signals (e.g., carrier waves, infrared signals, digital signals, etc.)), etc.

Figure 1:
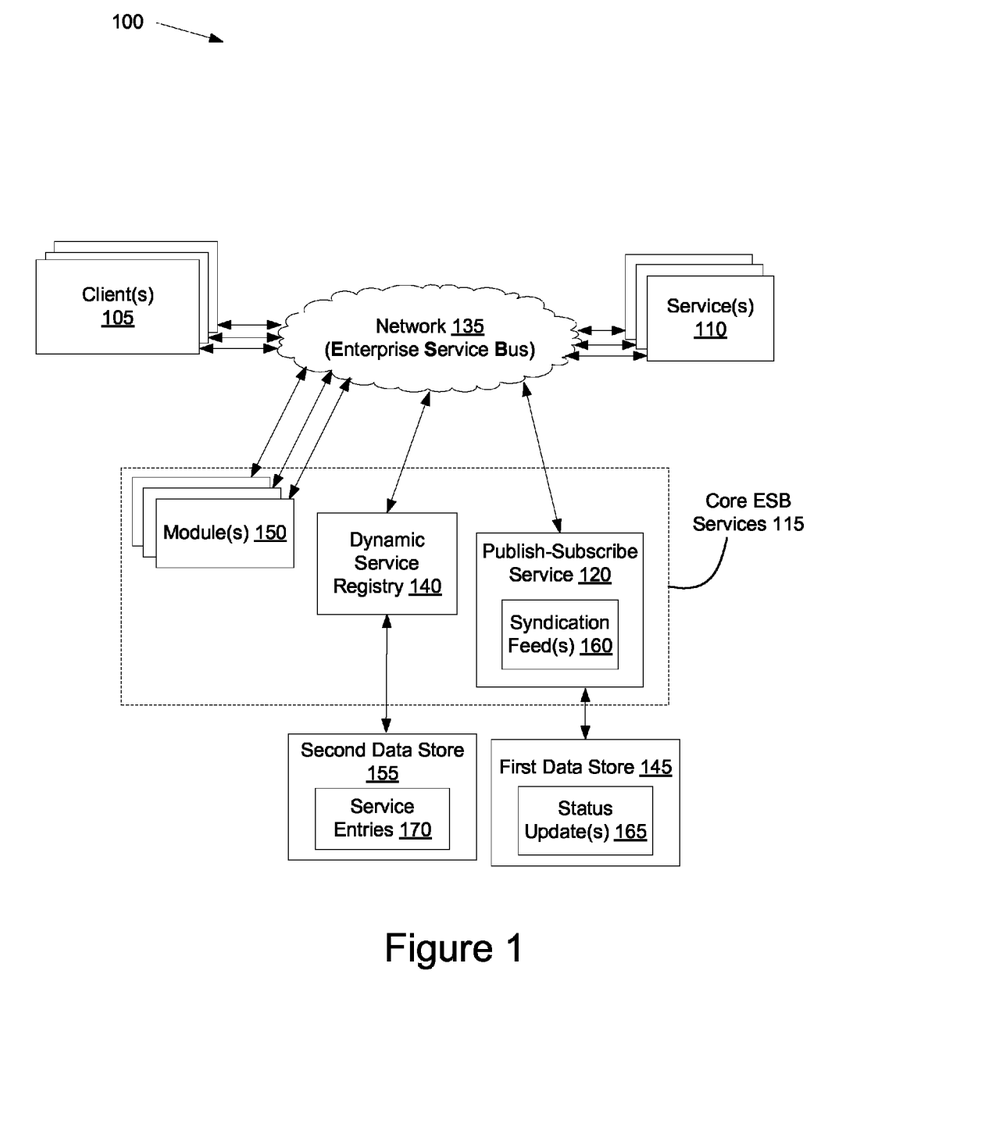
FIG. 1 illustrates an exemplary distributed system, in which embodiments of the present invention may operate.

FIG. 1 illustrates an exemplary distributed computing system 100, in which embodiments of the present invention may operate. In one embodiment, the distributed computing system 100 includes a service oriented architecture (SOA). A service oriented architecture (SOA) is an information system architecture that organizes and uses distributed capabilities (services) for one or more applications. SOA provides a uniform means to offer, discover, interact with and use capabilities (services) distributed over a network. Through the SOA, applications may be designed that combine loosely coupled and interoperable services.

The distributed computing system 100 may include clients 105 and services 110, connected via a network 135. The network 135 may be a public network (e.g., Internet), a private network (e.g., Ethernet or a local area Network (LAN)), or a combination thereof. In one embodiment, the network 135 includes an enterprise service bus (ESB). An ESB is an event-driven and standards-based messaging engine that provides services for more complex architectures. The ESB provides an infrastructure that links together services 110 and clients 105 to enable distributed applications and processes. In one embodiment, the ESB includes components that are installed on one or more of the clients 105 and services 110. Alternatively, the ESB may not include any components installed on the clients 105 and/or on the services 110. The ESB may be implemented to facilitate an SOA. In one embodiment, the ESB is a single bus that logically interconnects all available services 110 and clients 105. Alternatively, the ESB may include multiple busses, each of which may logically interconnect different services and/or clients.

Clients 105 may be, for example, personal computers (PC), palm-sized computing devices, personal digital assistants (PDA), etc. Clients 105 may also be applications run on a PC, server, database, etc. In the SOA, clients 105 include applications that access services 110. Clients 105 may be fat clients (clients that perform local processing and data storage), thin clients (clients that perform minimal or no local processing and minimal to no data storage), and/or hybrid clients (clients that perform local processing but little to no data storage).

Services 110 may be discretely defined sets of contiguous and autonomous functionality (e.g., business functionality, technical functionality, etc.). Services 110 may be resident on personal computers (PC), servers, routers, etc. Each service 110 may represent a process, activity or other resource that can be accessed and used by other services or clients on network 135. Each service 110 may be independent of other services 110, and may be accessed without knowledge of its underlying platform implementation.

In an example for a business function of "managing orders," services may include, for example, create order, fulfill order, ship order, invoice order, cancel/update order, etc. Each such service may be autonomous from the other services that are used to manage orders, and may be remote from one another and have different platform implementations. However, the services may be combined and used by one or more applications to manage orders.

In one embodiment, the ESB includes a collection of core ESB services 115. The core ESB services 115 are specialized services that enhance and/or enable functionality of the ESB. Messages can be directed towards any of the core ESB services 115, and/or the core ESB services 115 can act on messages that flow through the ESB. Any of the core ESB services 115 may include one or more general purpose computing devices (e.g., personal computer or server) and/or a special purpose computing devices configured to act on messages that flow between message producers (e.g., clients or services) and message consumers (e.g., clients or services) within the ESB.

The core ESB services 115 may include one or more modules 150, each of which may be a service of the ESB. Examples of modules 150 include modules that provide services for redirecting a message from an original intended endpoint, splitting a message into multiple messages, combining multiple messages into a single message, transforming messages from a first format to a second format, applying rules to a message, storing copies of messages, providing a registry of available services, etc. Each module 150 may provide a service to clients 105 and/or services 110 of the distributed computing system 100.

In one embodiment, the core ESB services 115 include a publish-subscribe service 120 that includes multiple syndication feeds 160. The publish-subscribe service 120 may be connected to a first data store 145, on which the publish-subscribe service 120 stores status updates 165 that are published to the syndication feeds 160. The first data store 145 may include volatile memory (e.g., random access memory (RAM)) and/or nonvolatile memory (e.g., nonvolatile RAM, Flash memory, hard disk drive, etc.). In one embodiment, first data store 145 is internal to a server that hosts the publish-subscribe service 120. Alternatively, first data store 145 may be external to the server that hosts the publish-subscribe service 120, and connected with the server either directly or via a network.

In one embodiment, the publish-subscribe service 120 distributes information regarding the availability of services (e.g., status updates) to subscribers of syndication feeds 160 using a publish-subscribe model. In a publish-subscribe model, an entity publishes information to a node (syndication feed) at a publish-subscribe service, and the publish-subscribe service propagates the information to all entities that are authorized to receive the information (subscribers).

The publish-subscribe service 120 includes multiple different syndication feeds 160 (otherwise known as channels or nodes). In one embodiment, each syndication feed 160 is associated with a distinct category of service. For example, a first syndication feed may be associated with flight reservation services, a second syndication feed may be associated with banking services, a third syndication feed may be associated with retail services, and so on. Each flight reservation service may publish information to the first syndication feed, each banking service may publish information to the second syndication feed, etc. Alternatively, each syndication feed 160 may be associated with a different service 110, 115. In such an embodiment, only a single service may publish to each syndication feed 160.

Services 110, 115 publish status updates 165 to the publish-subscribe service 120 to notify clients 105 and/or other services 110, 115 of the availability of the publishing services. Status updates 165 may include an availability status (e.g., whether the service is online) and/or identifying information about the service (e.g., service policy, service address, description, etc.). Services 110, 115 on the distributed computing system 100 may also occasionally be modified to change a service address. When such a modification is made, the service 110, 115 may publish a status update 165 to a syndication feed 160 to notify subscribers of the modification.

In one embodiment, services 110, 115 automatically publish status updates 165 when the services 110, 115 boot up and/or gain network access. Services 110, 115 may also periodically or continuously publish status updates 165 to notify the distributed computing system 100 that the service 110, 115 is still available. If no status updates 165 have been published by a service 110, 115 for a specified period of time, it may be determined that the service 110, 115 has become unavailable. When the availability of a service 110, 115 changes, the publish-subscribe service 120 may notify the subscribing clients 105, services 110, 115 and/or dynamic service registry 140 of the new availability status.

In one embodiment, the publish-subscribe service 120 is a presence service. A presence service monitors the presence of multiple entities in a distributed computing system. Herein, presence refers to a service's presence on the distributed computing system 100. If a service 110, 115 is present on the distributed computing system 100, then the service 110, 115 is available for providing functionality to clients 105 and/or other services 110. A presence service receives presence notifications from multiple entities, and propagates the presence notifications to any entities that are subscribed to presence syndication feeds of those entities. At the most basic level, presence notifications include enough information to identify an entity, and indicate that it is available. Presence notifications may also include additional information, such as a service description, required protocols, security requirements, and so on.

In one embodiment, each service 110, 115 is associated with a different presence syndication feed. A presence syndication feed is a syndication feed 160 that is updated whenever the presence status of an associated service changes. The presence syndication feed can be updated via presence notifications. A service 110, 115 publishes presence notifications to a presence syndication feed when the service 110, 115 becomes available and/or at regular intervals to indicate that the service is still available. A service may also update and/or change its presence information by sending a new presence notification.

Upon a presence notification being published to a presence syndication feed, the presence service notifies all subscribers of that presence syndication feed that the service associated with the presence syndication feed is available. If no presence notifications are published to a presence syndication feed for a predetermined time period, the presence service may publish a presence notification to an appropriate presence syndication feed indicating that the service associated with the presence syndication feed is not available. The presence service may also periodically send presence probes to services 110, 115 to determine if those services 110, 115 are still available. If a service 110, 115 is still available, it can respond to the presence probe with a presence notification.

In one embodiment, the presence service groups presence syndication feeds based on categories of services. For example, the presence service may combine all banking services into a single group, and all taxi services into a single group. Subscribers can subscribe to a presence service group, in which case the subscribers receive presence notifications from each presence syndication feed that belongs to the presence service group. Alternatively, subscribers may subscribe to presence syndication feeds of individual services.

In one embodiment, the publish-subscribe service 120 is an instant messaging service. An instant messaging service can facilitate near instantaneous communication between entities on a distributed computing system. Therefore, the instant messaging service can facilitate communication between clients 105 and services 110, 115 with minimal delays. The instant messaging service facilitates communication by establishing channels of communication between clients 105 and services 110, 115. Typically, a client 105 sends a message to the instant messaging service with enough information for the instant messaging service to identify a particular service (e.g., a name of the service). The instant messaging service then establishes a channel of communication between the requesting client and the requested service. Once the channel of communication is established, the client and the service can exchange messages that include only a payload (e.g., the messages may not need to include an address of the recipient, header information, or other metadata).

In one embodiment, the publish-subscribe service 120 is both a presence service and an instant messaging service. An example of such a publish-subscribe service 120 is an Extensible Messaging and Presence Protocol (XMPP) service. Such a publish-subscribe service 120 can distribute presence notification and other status updates 165 to subscribers of a syndication feed 160 automatically when new status updates 165 are published to the syndication feed 160. Status updates 165 may be pushed to the subscribers using XMPP, or a combination of XMPP and an XMPP publish-subscribe protocol extension. When a new status update 165 is published to a syndication feed 160, the publish-subscribe service 120 can automatically send the new status update 165 to the subscribers using XMPP. As a result, the subscribers may receive new status updates 165 almost immediately upon those status updates 165 being published to a syndication feed 160.

In one embodiment, the publish-subscribe service 120 uses the Atom Syndication Format. The Atom Syndication Format defines a structure for syndication feeds 160 and information that can be published in syndication feeds 160. In the Atom Syndication Format, each of the syndication feeds 160 is represented by an Atom feed document. Status updates 165 of services 110, 115 can be published to an Atom feed document as a payload of an Atom entry document. Atom entry documents can include multiple different types of data, including plain text, escaped hypertext markup language (HTML), well-formed HTML, arbitrary extensible markup language (XML), and binaries. Moreover, Atom entry documents can include pointers to additional content that is not directly included in a syndication feed 160, and can reference additional content by a universal resource identifier (URI).

In one embodiment, the publish-subscribe service 120 distributes entries of the syndication feeds 160 to subscribers using the Atom Publishing Protocol (AtomPub) or Really Simple Syndication (RSS) protocol. Both the Atom Publishing Protocol and the RSS protocol are application-level protocols for content publishing and management using HTTP and XML. These protocols provide facilities for creating, editing, deleting and distributing resources. The Atom Publishing Protocol and the RSS protocol enable resources to be managed and published as collections of resources, which may or may not be hierarchically arranged. If AtomPub or RSS is used, subscribers can retrieve status updates 165 from the publish-subscribe service 120 using standard HTTP commands by polling the publish-subscribe service 120.

In one embodiment, the core ESB services 115 include a dynamic service registry 155. The dynamic service registry 155 provides information on available services 110, 115 to clients 105. A client 105 may query the dynamic service registry 140 to determine one or more services 110, 115 that are available on the distributed computing system 100, and how to contact the service 110, 115 (e.g., via an HTTP service address). The query may request information on one or more services 110, 115 or types of services. Once an appropriate service has been identified by the dynamic service registry 140, the dynamic service registry 140 may send information on that service (e.g., including a service name and/or service address) to the client 105. The client 105 may then send a message to the service 110 using the service address.

In one embodiment, in which the publish-subscribe service 120 is an instant messaging service (e.g., where there publish-subscribe service is an XMPP service), the dynamic service registry 140 sends the client 105 information that the instant messaging service uses to identify the service 110, 115. Such information may include simply a name of the service, or may include a name of the service and additional information. The client 105 can then send a message to the publish-subscribe service 120 along with the name of the intended recipient service, and the publish-subscribe service 120 can establish a communication channel between the service 110, 115 and the client 105. In another embodiment, the dynamic service registry 140 sends a service address (e.g., an IP address) of the service to the client 105. The client 105 may then directly communicate with the service 110.

In another embodiment, clients 105 subscribe to syndication feeds 160. Clients 105 may then receive status updates from the publish-subscribe service without querying the dynamic service registry 140.

In one embodiment, the dynamic service registry 140 is connected to a second data store 155, on which it maintains information on some or all services of the distributed computing system 100 (e.g., including services 110 and core ESB services 115). The second data store 155 may include volatile and/or non-volatile memory, and may be external or internal to a server that hosts the dynamic service registry 140.

The dynamic service registry 140 may store multiple service entries 170 on the second data store 155, each of which includes service information for a single service or set of services. A service entry 170 may include a service availability status, a formal service description (e.g., identifying a service as a flight booking service), service policy (which may include message context requirements (e.g., custom fields or filters, transactional information, security information, transactional requirements, reliability characteristics, whether the service is secure, etc.), service capabilities, protocol and message format requirements, etc.), and a service address (e.g., a host number and a port number for services using HTTP or FTP, a JMS queue name for services using JMS, an XMPP address for a service, etc.). At least some information included in the service entries 170 is based on status updates 165 (which may include presence notifications). Such information may include, for example, service availability and service address. When new status updates 165 are received from the publish-subscribe service 120, service entries 170 associated with services 110, 115 identified in the status updates 165 can be updated. For example, if a status update 165 indicates that a service 110, 115 is located at a new service address, a service address for that service 110, 115 can be changed in an appropriate service entry 170.

The dynamic service registry 140 subscribes to one or more syndication feeds 160 hosted by the publish-subscribe service 120. Whenever a status update 165 is published to a syndication feed 160, the publish-subscribe service 120 can send that status update 165 to the dynamic service registry 140. The dynamic service registry 140 may then store the status update 165 in the second data store 155, and/or may modify or add a new service entry 170 to the second data store 155 based on the received status update 165.

When the dynamic service registry 140 receives a query from a client 105, the dynamic service registry 140 can search the stored service entries 170 to determine available services 110, 115 that match criteria specified in the query. The dynamic service registry 140 may then select one of the available services, and send information on that service to the client 105.

In one embodiment, the dynamic service registry 140 polls a syndication feed 160 of the publish-subscribe service 120 upon receiving a query from a client 105. The dynamic service registry 140 may poll a syndication feed 160 associated with a category of service requested by the client 105 or a syndication feed 160 associated with a particular service. In such an embodiment, the dynamic service registry 140 may or may not store service entries 170 and/or status updates 165 in the second data store 170.

Figure 2:
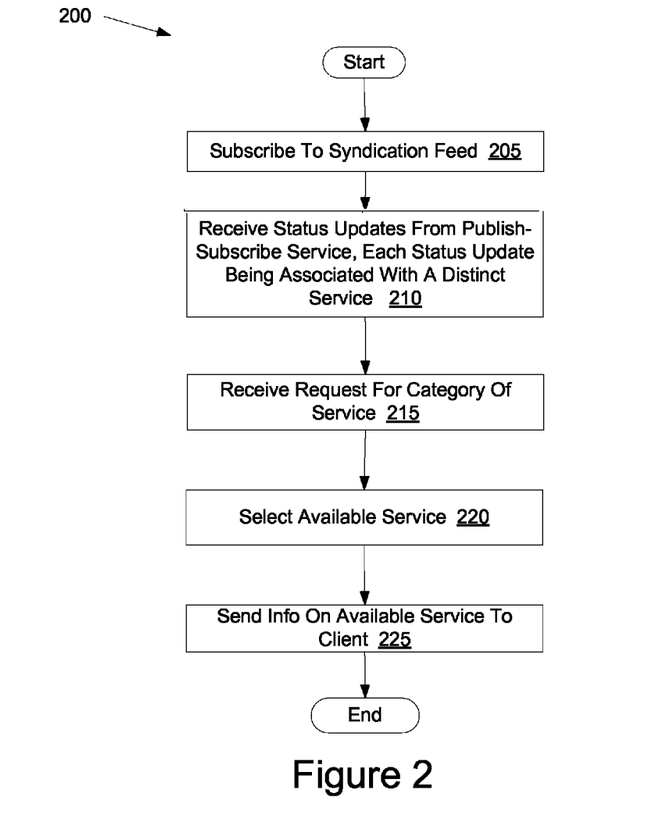
FIG. 2 illustrates a flow diagram of one embodiment for a method of providing information on available services in a distributed computing system.

FIG. 2 illustrates a flow diagram of one embodiment for a method 200 of providing information on available services in a distributed computing system. The method may be performed by processing logic that may comprise hardware (e.g., circuitry, dedicated logic, programmable logic, microcode, etc.), software (such as instructions run on a processing device), or a combination thereof. In one embodiment, method 200 is performed by an ESB (e.g., by a core service of an ESB, such as a dynamic service registry 140 of FIG. 1).

Referring to FIG. 2, at block 205 a dynamic service registry subscribes to a syndication feed. The syndication feed may be associated with a category of services or with a particular service. The syndication feed may or may not be a presence syndication feed.

At block 210, the dynamic service registry receives status updates from a publish-subscribe service. Each status update is associated with a distinct service. The status updates may be sent by the publish-subscribe service automatically when the status updates are published to the syndication feed hosted by the publish-subscribe service.

At block 215, the dynamic service registry receives a request for a category of service. Alternatively, the dynamic service registry may receive a request for a particular service. The request may be received from a client or from a service.

At block 220, the dynamic service registry selects an available service from the requested category of service. A service may be selected based on user preferences. Such user preferences may include preferred services and/or blacklisted services. If a preferred service is available, such a service will be selected over other services of a similar category. A blacklisted service may only be selected if no other services of a category are available. Alternatively, the dynamic service registry may select several or all of the available matching services. A service may also be selected in a load balanced manner. For example, if there are three different hotel booking services, the dynamic service registry may determine which of the three hotel booking services has the least amount of network traffic, and select that hotel booking service.

At block 225, the dynamic service registry sends information on the available service or services to the requesting client.

Figure 3:
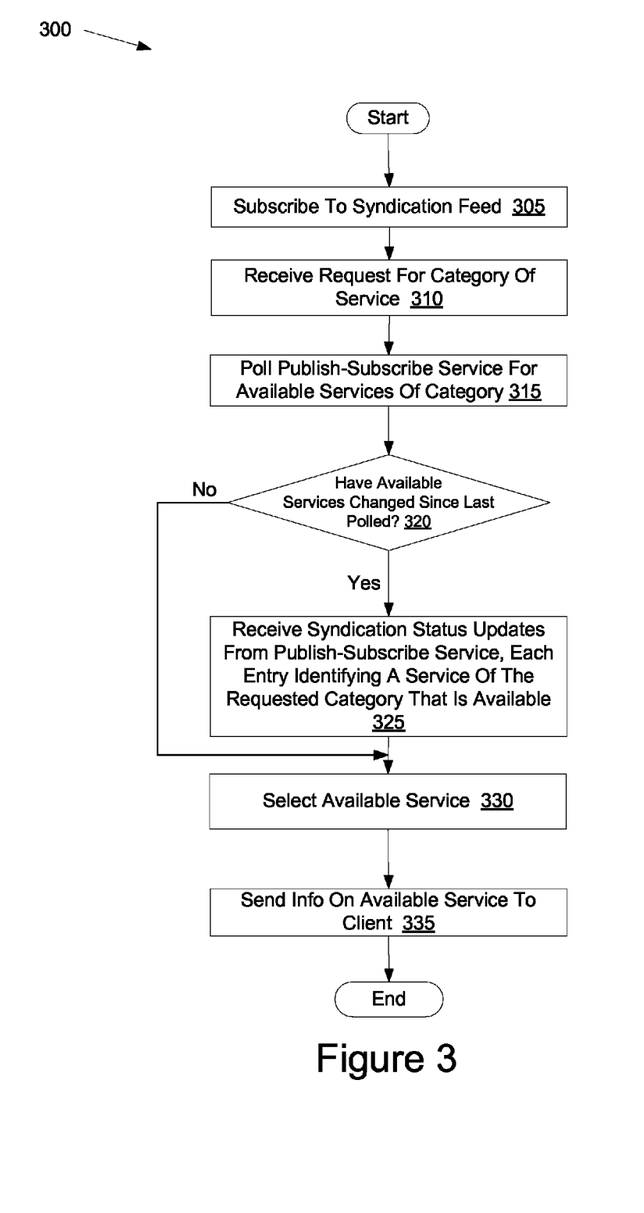
FIG. 3 illustrates a flow diagram of one embodiment for a method of providing information on available services in a distributed computing system.

FIG. 3 illustrates a flow diagram of one embodiment for a method 300 of providing information on available services in a distributed computing system. The method may be performed by processing logic that may comprise hardware (e.g., circuitry, dedicated logic, programmable logic, microcode, etc.), software (such as instructions run on a processing device), or a combination thereof. In one embodiment, method 300 is performed by an ESB (e.g., by a core service of an ESB, such as a dynamic service registry 140 of FIG. 1).

Referring to FIG. 3, at block 305 a dynamic service registry subscribes to a syndication feed. The syndication feed may be associated with a category of services or with a particular service. The syndication feed may or may not be a presence syndication feed. At block 310, the dynamic service registry receives a request for a category of service. Alternatively, the dynamic service registry may receive a request for a particular service.

At block 315, the dynamic service registry polls a publish-subscribe service for available services of the category. One or more syndication feeds hosted by the publish-subscribe service may be polled to determine the availability of services associated with those syndication feeds.

At block 320, if available services of the requested category of services have changed since the publish-subscribe service was last polled, the method proceeds to block 325. Otherwise the method proceeds to block 330.

At block 325, the dynamic service registry receives one or more status updates from the publish-subscribe service. Each status update may identify a service of the requested category that is available.

At block 330, the dynamic service registry selects an available service from the requested category of service. At block 335, the dynamic service registry sends information on the available service or services to the requesting client.

Figure 4:
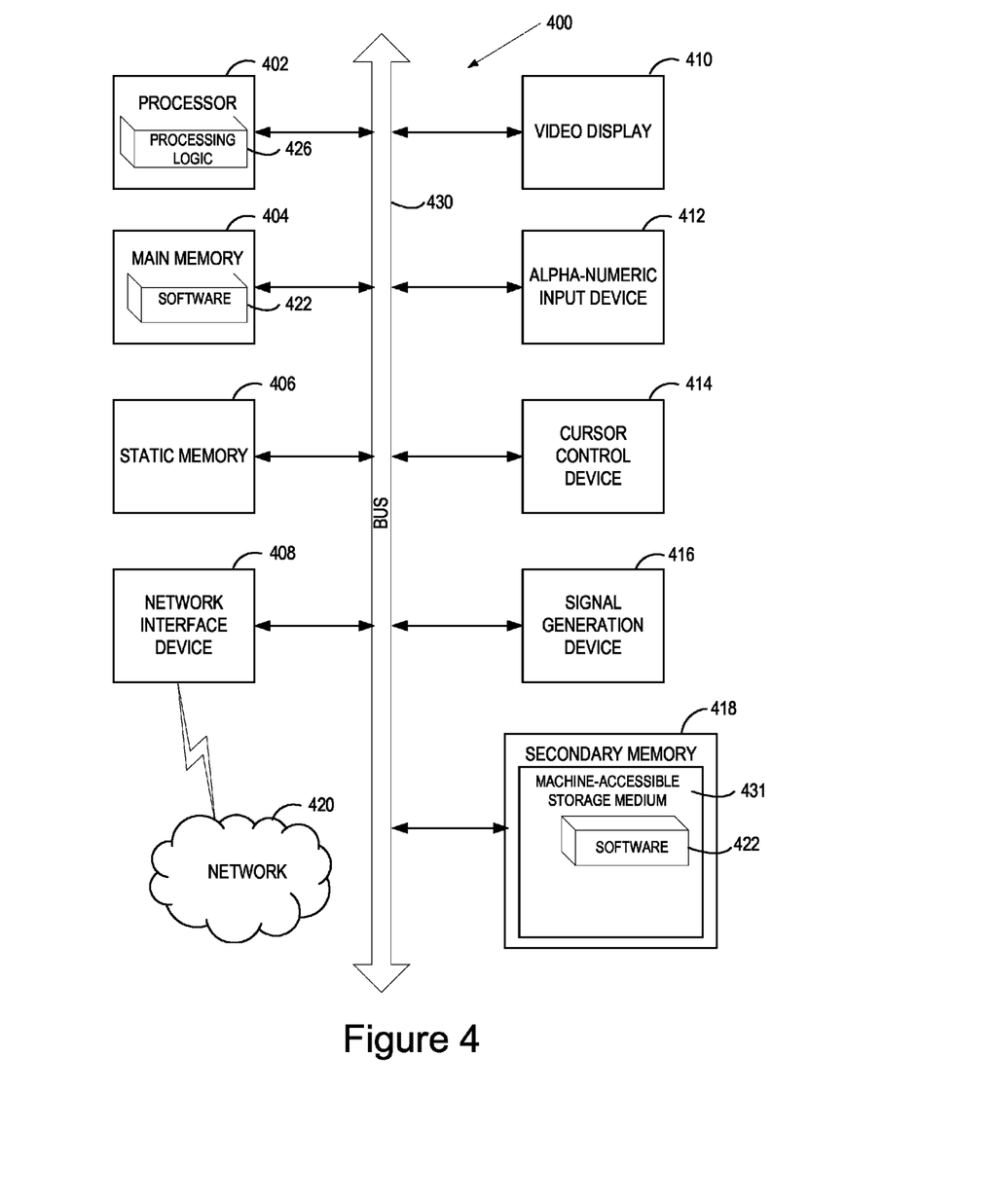
FIG. 4 illustrates a block diagram of an exemplary computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

The machine-readable storage medium 431 may also be used to store the publish-subscribe service 120 and/or dynamic service registry 140 of FIG. 1, and/or a software library containing methods that call the publish-subscribe service 120 and/or dynamic service registry 140. While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
   subscribing, by a service registry executed by a processing device, to a plurality of different syndication feeds provided by a publish-subscribe service, wherein the publish-subscribe service and the service registry are components of an enterprise service bus, and wherein each of the plurality of different syndication feeds is associated with a particular category of service of a plurality of categories of services;
   receiving a status update from the publish-subscribe service via a first syndication feed, the status update identifying services of a first category of service that are currently available, wherein the services of the first category publish the status update to the first syndication feed;

receiving, by the service registry, a request from a client identifying the first category of service;

selecting, by the service registry, at least one currently available service in view of the first category of service; and sending information concerning the selected at least one currently available service to the client.

2. The method of claim 1, further comprising:

polling the publish-subscribe service to request the status update.

3. The method of claim 1, further comprising:

receiving the status update in near real time when a status of an available service changes and when a new service of the first category of service becomes available.

4. The method of claim 3, wherein the publish-subscribe service comprises a presence service, and wherein each service of the first category of service is associated with a different presence syndication feed, the method further comprising:

subscribing to a presence service group, wherein the presence service group comprises each of the different presence syndication feeds; and receiving the status update as the status update is published to any of the different presence syndication feeds.

5. The method of claim 1, wherein the publish-subscribe service is an Extensible Messaging and Presence Protocol service.

6. The method of claim 1, wherein the syndication feed is at least one of a Really Simple Syndication feed or an Atom feed.

7. The method of claim 1, further comprising:

updating service entries in a data store by the service registry in view of the received status update, each service entry identifying an available service, wherein the selected available service belonging to the particular category of service is selected in view of the service entries in the data store.

8. A computing apparatus comprising:

a network interface to communicate with a plurality of clients and a publish-subscribe service of a distributed system that comprises an enterprise service bus; and a processing device, connected with the network interface, to execute instructions for a service registry, wherein the instructions cause the processing device to:

subscribe to a plurality of different syndication feeds provided by the publish-subscribe service, wherein the publish-subscribe service and the service registry are components of the enterprise service bus, and wherein each of the plurality of different syndication feeds is associated with a particular category of service of a plurality of categories of services;

receive a status update from the publish-subscribe service via a first syndication feed, the status update identifying services of a first category of service that are currently available, wherein the services of the first category publish the status update to the first syndication feed;

receive a request from a client identifying the particular category of service;

select at least one currently available service in view of the first category of service; and send information concerning the selected at least one currently available service to the client.

9. The computing apparatus of claim 8, further comprising:

the publish-subscribe service to host the syndication feed, wherein the publish-subscribe service is an Extensible Messaging and Presence Protocol service.

10. The computing apparatus of claim 9, wherein the publish-subscribe service comprises a presence service, and wherein each service of the first category of service is associated with a different presence syndication feed, the computing apparatus further comprising the instructions to cause the processing device to:

subscribe to a presence service group, wherein the presence service group comprises each of the different presence syndication feeds; and receive status updates as the status updates are published to any of the different presence syndication feeds.

11. The computing apparatus of claim 8, wherein the instructions cause the processing device to poll the publish-subscribe service to request the status updates.

12. The computing apparatus of claim 8, further comprising the instructions to cause the processing device to:

receive a status update when a status of an available service changes and when a new service of the first category of service becomes available.

13. The computing apparatus of claim 8, wherein the syndication feed is at least one of an RSS feed or an Atom feed.

14. The computing apparatus of claim 8, further comprising:

a data store to store a service entry identifying an available service;

wherein the instructions to cause the processing device to update service entries in the data store in view of the received status update, the processing device to select the available service belonging to the first category of service in view of the service entries in the data store.

15. A non-transitory computer readable medium including instructions that, when executed by a processing device, cause the processing device to perform operations comprising:

subscribing, by a service registry executed by a processing device, to a plurality of different syndication feeds provided by a publish-subscribe service, wherein the publish-subscribe service and the service registry are components of an enterprise service bus, and wherein each of the plurality of different syndication feeds is associated with a particular category of service of a plurality of categories of services;

receiving a status update from the publish-subscribe service via a first syndication feed, the status update identifying services of a first category of service that are currently available, wherein the services of the first category publish the status update to the first syndication feed;

receiving, by the service registry, a request from a client identifying the first category of service;

selecting, by the service registry, at least one currently available service in view of the first category of service; and sending information concerning the selected at least one currently available service to the client.

16. The non-transitory computer readable medium of claim 15, the operations further comprising:

polling the publish-subscribe service to request the status updates.

17. The non-transitory computer readable medium of claim 15, the operations further comprising:
    receiving a status update in near real time when a status of an available service changes and when a new service of the first category of service becomes available.

18. The non-transitory computer readable medium of claim 17, wherein the publish-subscribe service comprises a presence service, and wherein each service of the first category of service is associated with a different presence syndication feed, the operations further comprising:
    subscribing to a presence service group, wherein the presence service group comprises each of the different presence syndication feeds; and
    receiving status updates as the status updates are published to any of the different presence syndication feeds.

19. The non-transitory computer readable medium of claim 15, wherein the publish-subscribe service is an Extensible Messaging and Presence Protocol service.

20. The non-transitory computer readable medium of claim 15, wherein the syndication feed is at least one of a Really Simple Syndication feed or an Atom feed.

21. The non-transitory computer readable medium of claim 15, the operations further comprising:
    updating service entries in a data store by the service registry in view of on the received status update, each service entry identifying an available service, wherein the selected available service belonging to the first category of service is selected in view of the service entries in the data store.

* * * * *